United States Patent
Leith et al.

(10) Patent No.: US 12,024,820 B1
(45) Date of Patent: Jul. 2, 2024

(54) MULTI-TENSILE ASSEMBLY FOR A BAND USED WITH ELECTRONIC DEVICES

(71) Applicant: Apple Inc., Cupertino, CA (US)

(72) Inventors: William Leith, San Francisco, CA (US); Charlotte M. Baravian, Campbell, CA (US); Le Zhao, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/225,614

(22) Filed: Jul. 24, 2023

Related U.S. Application Data (60) Provisional application No. 63/409,188, filed on Sep. 22, 2022.

(51) Int. Cl.
*D07B 1/02* (2006.01)

(52) U.S. Cl.
CPC ...... *D07B 1/025* (2013.01); *D07B 2201/1096* (2013.01); *D07B 2201/2091* (2013.01); *D07B 2205/2075* (2013.01); *D07B 2205/3021* (2013.01); *D07B 2401/2045* (2013.01); *D07B 2801/62* (2013.01)

(58) Field of Classification Search
CPC ...................................... D07B 1/025
See application file for complete search history.

(56) References Cited

U.S. PATENT DOCUMENTS

| | | | | |
|---|---|---|---|---|
| 11,714,453 B1* | 8/2023 | Dalke | ............... | G02B 27/0176 |
| | | | | 361/679.03 |
| 11,726,523 B1* | 8/2023 | Hatfield | ............... | G06F 1/163 |
| | | | | 381/333 |
| 11,733,526 B1* | 8/2023 | Jo | ............... | G02B 27/0176 |
| | | | | 345/8 |
| 11,733,530 B1* | 8/2023 | Wang | ............... | G02B 27/0172 |
| | | | | 359/630 |
| 11,740,691 B1* | 8/2023 | Hossain | ............... | G06F 3/011 |
| | | | | 73/526 |
| 11,768,518 B1* | 9/2023 | Jo | ............... | G02B 27/0176 |
| | | | | 361/679.03 |
| 2021/0026148 A1* | 1/2021 | Yoon | ............... | G02B 27/0093 |
| 2023/0244084 A1* | 8/2023 | Kobayashi | ............... | H04N 5/64 |
| | | | | 359/630 |

* cited by examiner

*Primary Examiner* — Chun-Nan Lin
(74) *Attorney, Agent, or Firm* — BAKERHOSTETLER (57) ABSTRACT

An assembly with multiple structures, each having different tensile strengths, is integrated into a band used with various electronic devices. The assembly may include a low-tensile structure designed to elongate under an initial tension, thus allowing the band to stretch and lengthen. However, additional tension applied to the band is transferred to other structures of the assembly. Further, when the applied tension causes the structure with the highest tensile strength in the assembly to straighten (or substantially straighten), the high-tensile strength structure prevents the band from further elongation. The low-tensile strength structure allows the band to conform to a user, while the high-tensile strength structure protects the low-tensile strength structure from damage or unwanted deformation.

20 Claims, 10 Drawing Sheets

MULTI-TENSILE ASSEMBLY FOR A BAND USED WITH ELECTRONIC DEVICES

CROSS-REFERENCE TO RELATED APPLICATION(S)

The present application claims the benefit of U.S. Provisional Application No. 63/409,188, entitled "MULTI-TENSILE ASSEMBLY FOR A BAND USED WITH ELECTRONIC DEVICES," filed Sep. 22, 2022, the content of which is incorporated herein by reference in its entirety for all purposes.

TECHNICAL FIELD

This application is directed to a band for electronic devices, and more particularly, to a band with structures having different tensile strengths that allow the band to elongate to a certain dimension and subsequently providing a lockout to prevent further elongation.

BACKGROUND

Some devices are equipped with stretchable bands used to secure the device to a user's body, including, for example, a user's appendage. Generally, bands include elastically stretchable material used to conform to the appendage.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

A head-mountable device (HMD), such as a head-mounted display, headset, visor, smartglasses, head-up display, etc., can perform a range of functions that is determined by the components (e.g., sensors, circuitry, and other hardware) included with the HMD as manufactured. For example, head-mounted displays with virtual reality capabilities can replace a natural, real-life environment with virtual content. In another example, head-mounted displays with augmented, or mixed, reality capabilities allow users to view certain computer-generated images superimposed onto a natural, real-life environment.

In order to fit and maintain an HMD on a user's head, a band can attach to the HMD. Traditional bands include one or more fabrics. Alternatively, or in combination, traditional bands come in different sizes to accommodate different user head sizes.

The subject technology is directed to an assembly of structures, or components, with different tensile strengths integrated together to form a multi-tensile assembly. Accordingly, an assembly described herein may include different structures, each with a material (or materials) having different abilities to resist breaking under tension. As an example, an assembly described herein includes a stretchable material, a braided cable, and a wire. The stretchable material may include an elastomer material. The braided cable may include multiple strands of polymers (e.g., polyethylene terephthalate (PET)). The wire may include a metal or metal alloy. The tensile strength of the materials of the assembly is based upon the respective makeups.

When the structures of the assembly are integrated together, the braided cable can wrap around and conceal the wire and the stretchable material. The wire may wrap loosely around the stretchable material. Put another way, the wire may be under minimal or no tension when wrapped around the stretchable material. When integrated with a band, the assembly provides the band with different characteristic behaviors for responding to tension. For example, when the band begins to undergo tension, the band lengthens and the load provided by the tension initially causes the stretchable material, having the lowest relative tensile strength of the structures of the assembly, to lengthen by stretching. Beneficially, the properties of the stretchable material allow the band to more easily stretch around, and conform to, a user's head.

Additional tension (e.g., a higher pulling force) placed on the band may cause the band to further lengthen. The additionally applied tension may be transferred to the braided cable, which has a higher tensile strength than that of the stretchable material, and accordingly, is relatively inelastic as compared to the stretchable material. The braided cable provides relief to the stretchable material by reducing the likelihood of plastic deformation, breakdown, or damage to the stretchable material, thus reducing the likelihood of unwanted permanent deformation of the stretchable material. In order to absorb the additional tension, the strands of the braided cable are displaced. For example, the tension causes the angular displacement of the strands to change, which can elongate the braided cable.

When additional tension is applied, the band can further lengthen. The additional tension pulls the wire (having the highest relative tensile strength) and causes the wire to transition from its original, loose position to being relatively straight. The displacement of the wire may include an angular displacement. When the wire resists further straightening, the band will no longer lengthen under additional applied tension. Beneficially, the wire acts as a lockout feature that protects the stretchable material and/or the braided cable from damage due to stress and strain from the additional applied tension. By integrating the assembly with the band, the band can provide a low-stiffness feature for enhancing user feel and user ability to receive an HMD around the user's head, while also minimizing or preventing the HMD and/or the band from sagging from the user's head, as well as protecting the structural integrity of the band.

These and other embodiments are discussed below with reference to FIGS. 1-12. However, those skilled in the art will readily appreciate that the detailed description given herein with respect to these Figures is for explanatory purposes only and should not be construed as limiting.

Figure 1:
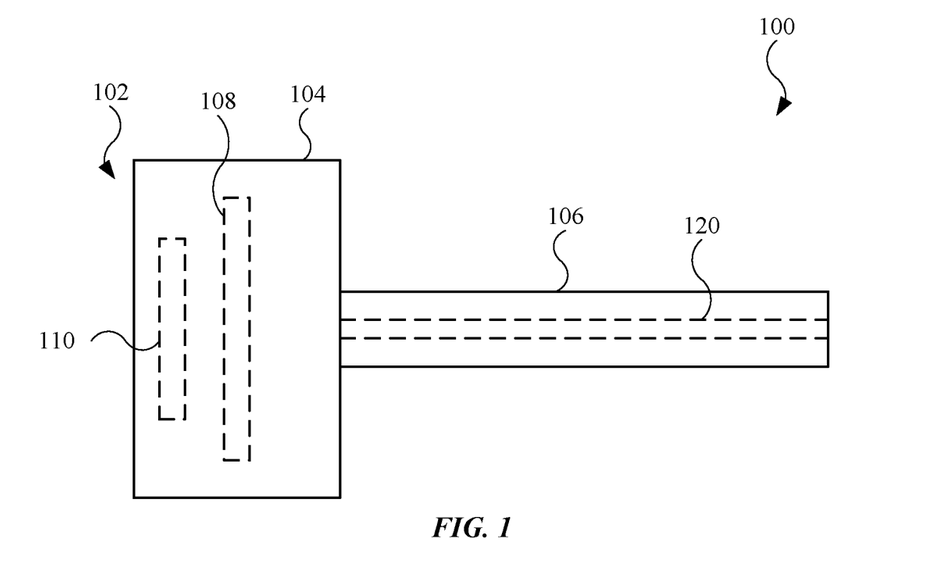
FIG. 1 and FIG. 2 illustrate a head-mounted device, in accordance with aspects of the present disclosure.

According to some embodiments, for example as shown in FIG. 1, a system 100 can include a head-mountable device 102 that includes a frame 104 and a band 106 coupled to the frame 104. The frame 104 can be positioned in front of the eyes of a user to provide information within a field of view of the user. The frame 104 can provide nose pads or another feature to rest on a user's nose. The frame 104 further includes one or more displays 108 (e.g., one for each eye). The head-mountable device 102 can include a camera 110 for capturing a view of an environment external to the head-mountable device 102. The one or more displays 108 can provide visual (e.g., image or video) output based on the view captured by the camera 110. For example, the one or more displays 108 can transmit light from the camera 110 based on a physical environment for viewing by the user. The one or more displays 108 can include components with optical properties, such as lenses for vision correction based on incoming light from the physical environment. Additionally or alternatively, the one or more displays 108 can provide information as a display within a field of view of the user. Displayed information can be provided to the exclusion of a view of a physical environment or in addition to (e.g., overlaid with) a physical environment.

The frame 104 and/or the band 106 can serve to surround a peripheral region of the head-mountable device 102 as well as support any internal components in their assembled position. For example, the frame 104 can enclose and support various internal components (including for example integrated circuit chips, processors, sensors, input/output devices, memory devices, and other circuitry) to provide computing and functional operations for the head-mountable device 102.

The band 106 may provide an outer cover that holds/carries several structures, some of which include elastic properties while others include generally inelastic properties. In this regard, when a load applied by, for example, fitting the system 100 onto a user's head, the band 106 elongates. The band 106 may subsequently returns to its original size and shape when the load is removed. Also, the band 106 may include an assembly 120 integrated within the band 106. The assembly 120 may include multiple structures, with the different structures having tensile strength values. Thus, the assembly 120 may be referred to as a multi-tensile assembly.

Figure 2:
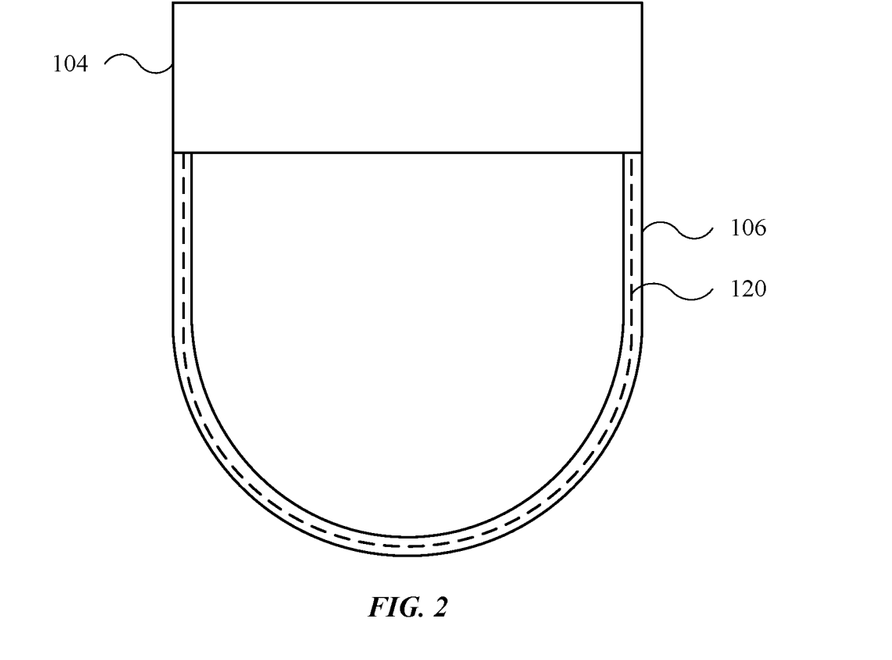

Referring to FIG. 2, the band 106 secures with opposing sides, or ends, of the frame 104 and accordingly, the band 106 can wrap or extend along opposing sides of a user's head. The assembly 120, including its structures (discussed below), may secure with opposing sides of the band 106. Further, the placement of the assembly 120 within the band 106 allows at least some components of the assembly 120 to elongate in response to a load applied to the band 106. Additionally, some components of the assembly 120 may become displaced in response to the applied load, while further limiting the length of the band 106. This will be shown and described in further detail.

Figure 3:
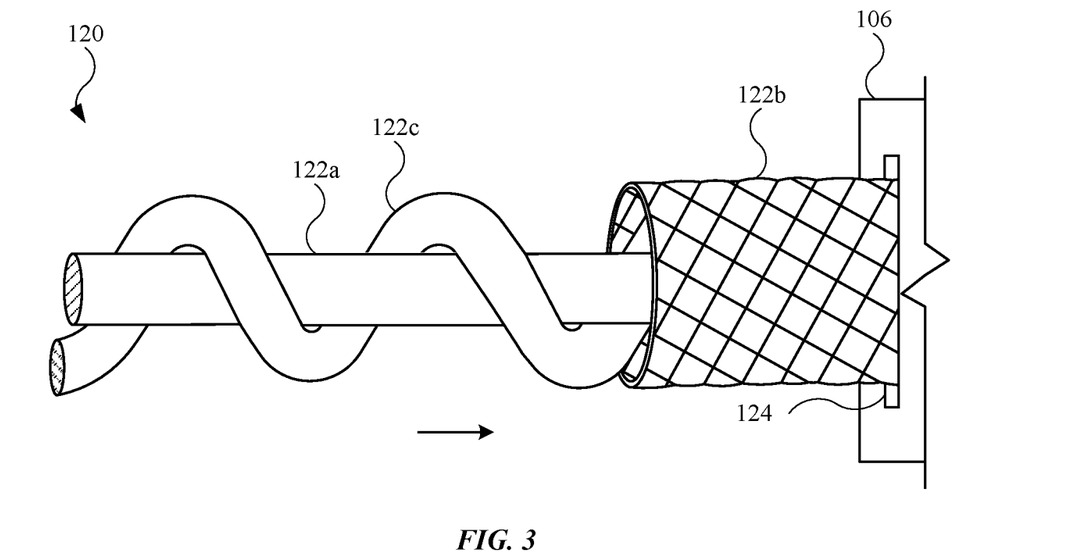
FIG. 3 and FIG. 4 illustrate an embodiment of a multi-tensile assembly, in accordance with aspects of the present disclosure.

Referring to FIG. 3, the assembly 120 and its structures are shown. The assembly 120 includes a first structure 122a, a second structure 122b, and a third structure 122c. As non-limiting examples, the first structure 122a may include an elastomer structure, spandex, or a combination thereof. Generally, the first structure 122a may include a material, or materials, capable of elongating and elastically stretching. For example, the first structure 122a, under an applied load, may stretch to an additional 10% to 20% of its original length. The second structure 122b may include several materials braided, or otherwise weaved, together. Accordingly, the second structure 122b may form a braided cable. As non-limiting examples, the second structure 122b may include materials such as PET, nylon, polyester, or another polymer. Based on the material makeup, the second structure 122b may include relatively inelastic properties as compared to the first structure 122a. The third structure 122c may include a wire. As non-limiting examples, the third structure 122c may include a metal (e.g., steel, stainless steel, copper), including a metal structure such as a metal wire. Alternatively, the third structure 122c may include one or more materials, such as multiple metal wires or multiple fibers formed from aramid and/or relatively high stiffness yarn, as non-limiting examples.

As shown, the third structure 122c is wrapped around the first structure 122a with relatively low tension, i.e., the third structure 122c is wrapped loosely around the first structure 122a. For example, some spaces or gaps may exist between the first structure 122a and the third structure 122c, as the third structure 122c may not be tightly wound around the first structure 122a. Although not shown, other arrangements are possible. For example, the third structure 122c can be located laterally to, and not wrapped around, the first structure 122a. Further, the second structure 122b can receive and conceal both of the first structure 122a and the third structure 122c. When assembled, the assembly 120 can be inserted into an internal chamber 124 (e.g., sleeve) of the band 106.

Based on their respective material makeups, the first structure 122a, the second structure 122b, and the third structure 122c include different tensile strengths and react to a force in different manners. For example, the first structure 122a includes the lowest tensile strength of the assembly 120, as compared to that of the second structure 122b and the third structure 122c. As a result, the first structure 122a is relatively more responsive to an applied tension and may elongate, whereas the second structure 122b and the third structure 122c may undergo little or no displacement under the same applied tension. However, when the applied tension increases, the additional tension may be transferred to the second structure 122b, causing displacement of the second structure 122b by changing the angle of the braided strands of the second structure 122b. Thus, the second structure 122b may also elongate. The added tension may also cause the angle of the third structure 122c to change.

Further, when additional tension is applied, the angle of the third structure 122c may continue to change, causing the third structure 122c to straighten, or become relatively straight. However, the third structure 122c, having the highest tensile strength of the assembly 120, may resist additional tension when becoming relatively straight, thus limiting further elongation of the assembly 120 and the band 106. Accordingly, the third structure 122c acts as a lockout feature to prevent further elongation of the band 106. Beneficially, the band 106 may include enhanced stability, as the assembly 120 serves to limit overstretching of the band 106, which may cause plastic deformation or breaking.

Figure 4:
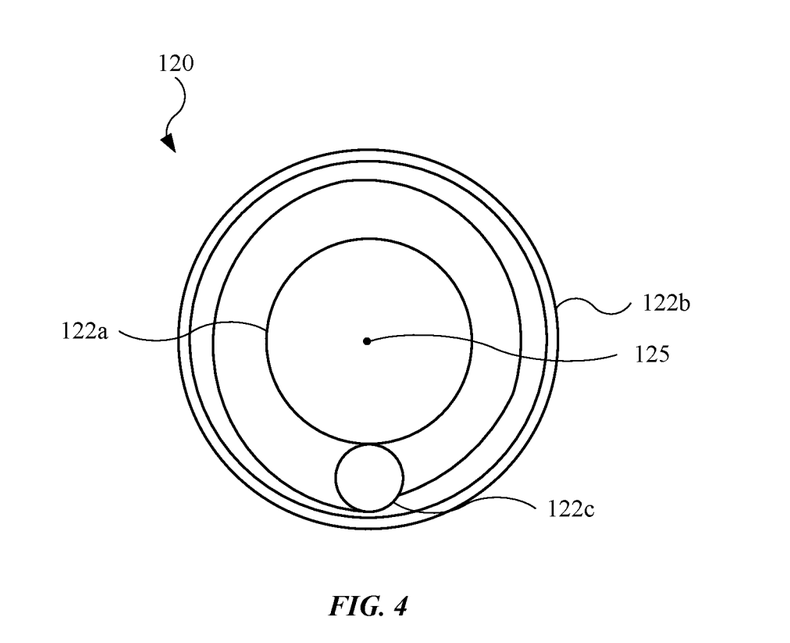

Referring to FIG. 4, the first structure 122a, the second structure 122b, and the third structure 122c of the assembly 120 may be co-axial and thus include a center point 125 that is common to the first structure 122a, the second structure 122b, and the third structure 122c. While the first structure 122a, the second structure 122b, and the third structure 122c are shown having a circular, or generally circular, cross section, other shapes are possible, including oblong shapes or shapes with 3 or more sides. Additionally, in some embodiments (not shown), at least one of the first structure 122a, the second structure 122b, and the third structure 122c is not co-axial with respect to the remaining structures.

Figure 5:
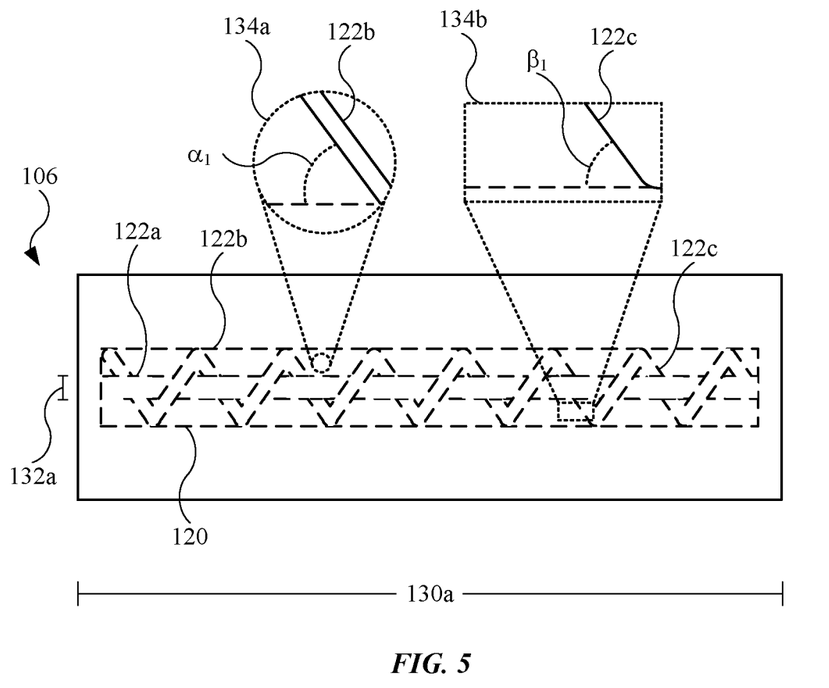
FIG. 5 illustrates a plan view of a band with a multi-tensile assembly integrated with the band, in accordance with aspects of the present disclosure.

FIGS. 5-8 show and describe an exemplary response of the band 106 to applied tension. Referring to FIG. 5, the assembly 120 is inserted in the band 106. The band 106 is shown as having a dimension 130a, corresponding to a 1-dimensional length. Further, the first structure 122a includes a dimension 132a, corresponding to a diameter of the first structure 122a. The dimension 130a and the dimension 132a represent dimensional properties of the band 106 and the first structure 122a, respectively, with no external force(s) other than gravity acting on the band 106.

Also, as shown in the enlarged view 134a, a strand 136 (representing additional strands) of the second structure 122b is positioned at an angle $\alpha_1$ with respect to a horizontal line. Further, as shown in the enlarged view 134b, the third structure 122c is positioned at an angle $\beta_1$ with respect to a horizontal line. The horizontal line may also define a surface of the first structure 122a, and accordingly, the angle $\beta_1$ is relative to the first structure 122a. The angle $\alpha_1$ and the angle $\beta_1$ represent angular properties of the strand 136 and the third structure 122c, respectively, with no external force(s) other than gravity acting on the band 106.

Figure 6:
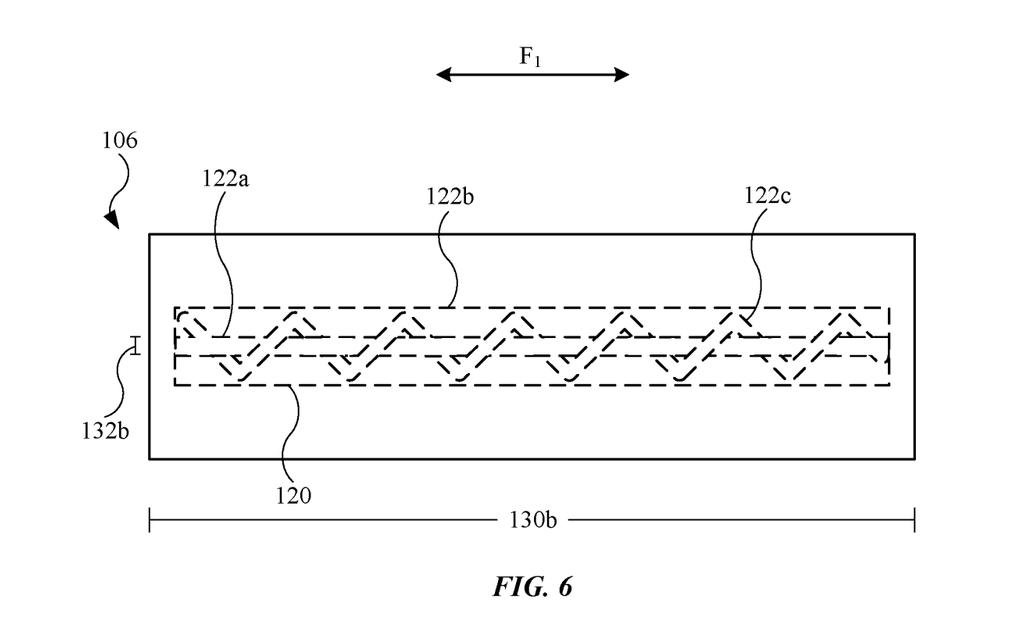
FIG. 6 illustrates a plan view of a band under tension, in accordance with aspects of the present disclosure.

Referring to FIG. 6, a force $F_1$ (e.g., tension) is applied to the band 106, causing the band 106 to increase to a dimension 130b, which is greater than the dimension 130a (shown in FIG. 5). When the force $F_1$ is applied to the assembly 120, the first structure 122a may be displaced prior to displacement of the second structure 122b and the third structure 122c. In this manner, the first structure 122a may elongate by, for example, approximately in the range of 10-20% of its original length, while little or no displacement of the second structure 122b and the third structure 122c occurs. This is due in part to the relatively low tensile strength of the first structure 122a, as compared to that of the second structure 122b and the third structure 122c. Also, based on the force $F_1$ and resultant elongation of the first structure 122a, the first structure 122a may include a dimension 132b, representing a reduced diameter of the first structure 122a as compared to the dimension 132a (shown in FIG. 5).

Figure 7:
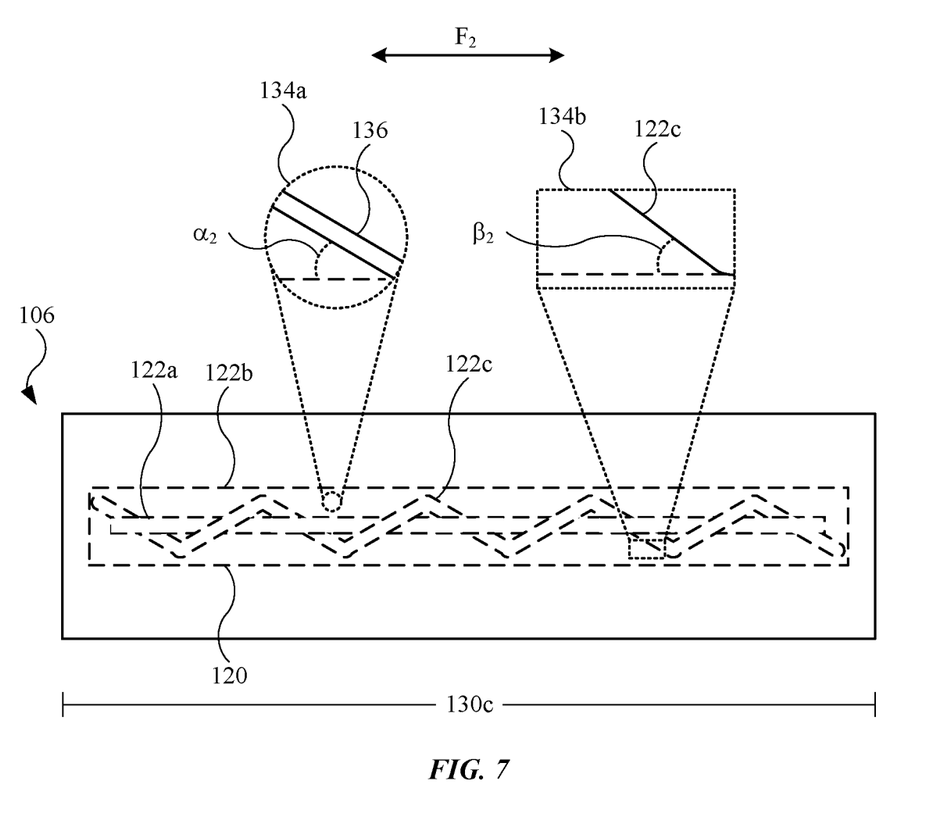
FIG. 7 illustrates a plan view of a band under additional tension, in accordance with aspects of the present disclosure.

Referring to FIG. 7, a force $F_2$ (e.g., tension) is applied to the band 106. The force $F_2$ is greater than the force $F_1$ (shown in FIG. 6), causing the band 106 to elongate to a dimension 130c, which is greater than the dimension 130b (shown in FIG. 6). The first structure 122a may undergo little or no displacement (e.g., elongation), and the additional force applied by $F_2$ may be transferred to the second structure 122b, causing displacement of the second structure 122b. As an example, when approximately 6 Newtons (N) of tension is applied to the band 106, the first structure 122a will no longer elongate. Further, when the tension exceeds 6N, the additional tension may be applied to one or more of the second structure 122b and the third structure 122c.

As shown in the enlarged view 134a, the strand 136 of the second structure 122b is displaced to an angle $\alpha_2$, which is lower than the angle $\alpha_1$ (shown in FIG. 5). The angular displacement of the strands (including the strand 136) may cause elongation of the second structure 122b. As shown in the enlarged view 134b, the third structure 122c is displaced to an angle $\beta_2$, which is smaller than the angle $\beta_1$ (shown in FIG. 5). Based on the reduced angle (e.g., angle $\beta_2$), the third structure 122c becomes relatively straight, and thus is displaced from its original position in the assembly 120.

Figure 8:
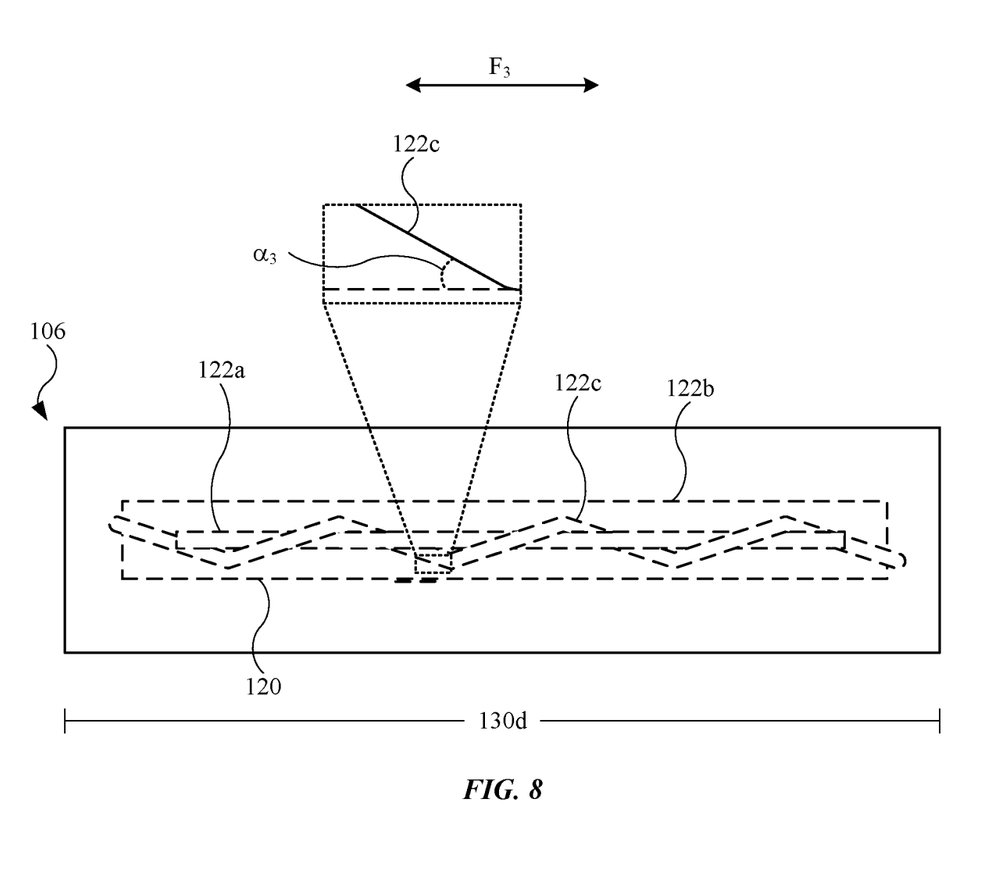
FIG. 8 illustrates a plan view of a band under additional tension, in accordance with aspects of the present disclosure.

Referring to FIG. 8, a force $F_3$ (e.g., tension) is applied to the band 106. The force $F_3$ is greater than the force $F_2$ (shown in FIG. 7), causing the band 106 to further elongate to a dimension 130d, which is greater than the dimension 130c (shown in FIG. 7). As shown in the enlarged view, the third structure 122c is displaced to an angle $\beta_3$, which is lower than the angle $\beta_2$ (shown in FIG. 7). The third structure 122c is wrapped tightly around the first structure 122a. Moreover, due in part to the relatively high tensile strength of the third structure 122c, the third structure 122c resists additional displacement. The third structure 122c can offset or counter additional applied forces to the band 106, thus holding the band 106 to a maximum length (corresponding to the dimension 130d) and preventing displacement of the third structure 122c, as well as prevent further displacement of the first structure 122a and the second structure 122b. Beneficially, the third structure 122c prevents or limits additional stress and strain on the first structure 122a and the second structure 122b, thus reducing the likelihood of breakdown or damage.

The multi-tensile properties of the assembly 120 provide several advantages for the band 106. For example, the first structure 122a provides a low-stiffness behavior, allowing the band 106 to elongate in a desired manner, while the third structure 122c (and to some degree, the second structure 122b) protects the first structure 122a from breakdown or damage and further prevents the band 106 from sagging while carrying an HMD (not shown).

In addition to the materials selected, other factors can control the assembly 120 to provide different elongation characteristics for the band 106. For example, referring to FIG. 5 and prior to any forces (other than gravity) acting on the band 106, the angle $\beta_1$ of the third structure 122c can be increased to a greater angle, thus allowing the band 106 to elongate further (i.e., further than the dimension 130d shown in FIG. 8) before the third structure 122c provides a lockout and prevent the band 106 from additional elongation. Conversely, the angle $\beta_1$ of the third structure 122c can be decreased to a lower angle, thus limiting the band 106 to a dimension that is shorter than the dimension 130d. Alternatively, or in combination, the angle $\alpha_1$ of the second structure 122b can be increased or decreased to allow the band 106 to elongate more or less, respectively. Also, the density of the braids that make up the second structure 122b can change (i.e., more or less dense) to alter the elongation properties for the band 106.

Figure 9:
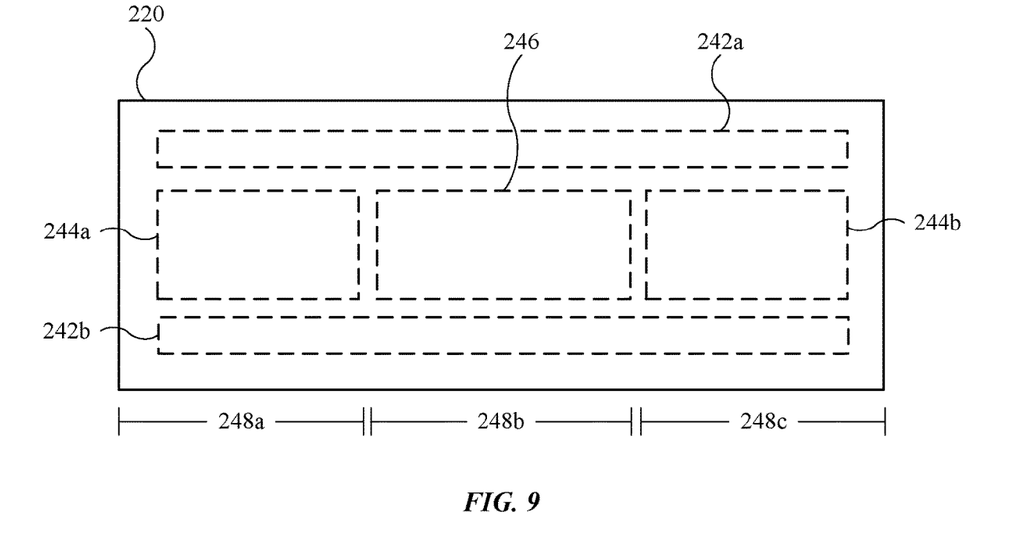
FIG. 9 and FIG. 10 illustrate alternate embodiments of multi-tensile assemblies integrated with respective bands, in accordance with aspects of the present disclosure.
Figure 10:
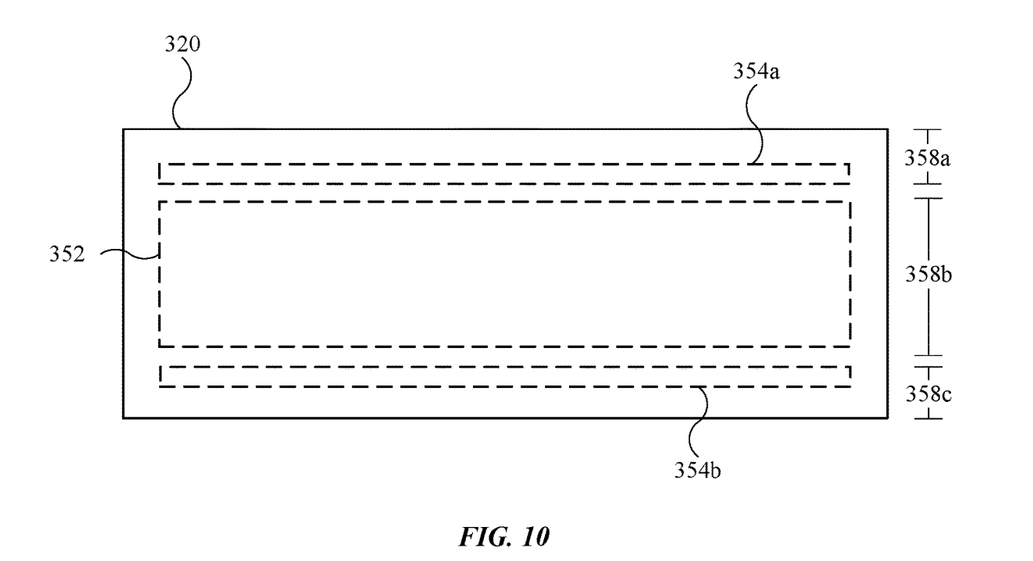

FIGS. 9 and 10 show different embodiments of an assembly for bands. Although not always expressly shown and described, the assemblies in FIGS. 9 and 10 may include several features shown and described for prior assemblies.

Referring to FIG. 9, an assembly 220 includes a structure 242a and a structure 242b. Additionally, the assembly 220 includes a structure 244a and a structure 244b. Also, the assembly 220 includes a structure 246. The structures 242a and 242b each includes a relatively low tensile strength, while the structure 246 includes a relatively high tensile strength. The structures 244a and 244b each includes a tensile strength greater than that of the structures 242a and 242b but lesser than that of the structure 246.

Also, the assembly 220 is divided into multiple sections, i.e., a section 248a, a section 248b, and a section 248c. Based on the disparate tensile strengths, the assembly 220 can elongate differently in different regions. For example, the structures 242a and 242b may respond by elongation in response to a force (e.g., tension) while the structure 246 does not elongate or is otherwise not displaced. Accordingly, the sections 248a and 248c can elongate to a greater degree as compared to the section 248b, and the assembly 220 provides localized elongation and lockout properties. As shown, the structure 246 (corresponding to the section 248b) is centrally located in the assembly 220. When the assembly 220 is integrated with a band for an HMD (not shown in FIG. 9), the portions associated with the sections 248a and 248c may elongate to a greater degree around the sides of a user's head, while the portion associated with the section 248b remains relatively less flexible at the back of the user's head.

Referring to FIG. 10, an assembly 320 includes a structure 352 surrounded by a structure 354a and a structure 354b. The structure 352 may include a relatively low tensile strength, while the structures 354a and 354b each includes a relatively high tensile strength. Also, the assembly 320 is divided into multiple sections, i.e., a section 358a, a section 358b, and a section 358c. Based on the disparate tensile strengths, the assembly 320 can elongate differently in different regions. For example, the structure 352 may respond by elongation in response to a force (e.g., tension) while the structures 354a and 354b do not elongate or is otherwise not displaced. Accordingly, the section 358b, being centrally located in the assembly 320, is designed to elongate to a greater degree as compared to the sections 358a and 358c. When the assembly 320 is integrated with a band for a device (not shown in FIG. 10), the assembly 320 can be placed over a user's joint (e.g., knee, elbow) and the section 358b can elongate at a location corresponding to the joint, while the sections 358a and 358c can resist at least some elongation.

Assemblies (e.g., assembly 120, assembly 220, or assembly 320) shown and described herein can be integrated into other electronic devices. For example, referring to FIG. 11A, a wearable device 360 (e.g., smartwatch) includes a band 362 with an assembly 364. The assembly 364 allow some elongation/expansion of the band 362 to fit around a user's wrist, while also limiting/resisting additional elongation of the band 362.

Figure 11A:
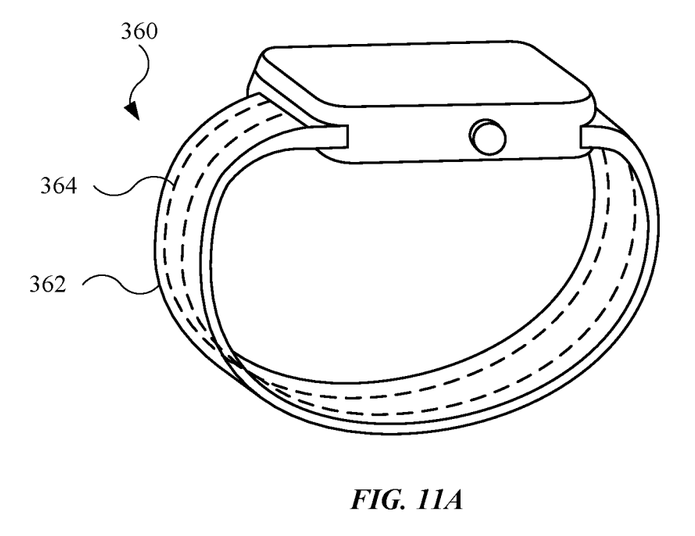
FIG. 11A, FIGS. 11B, and 11C illustrate alternate devices with multi-tensile assemblies, in accordance with aspects of the present disclosure.
Figure 11B:
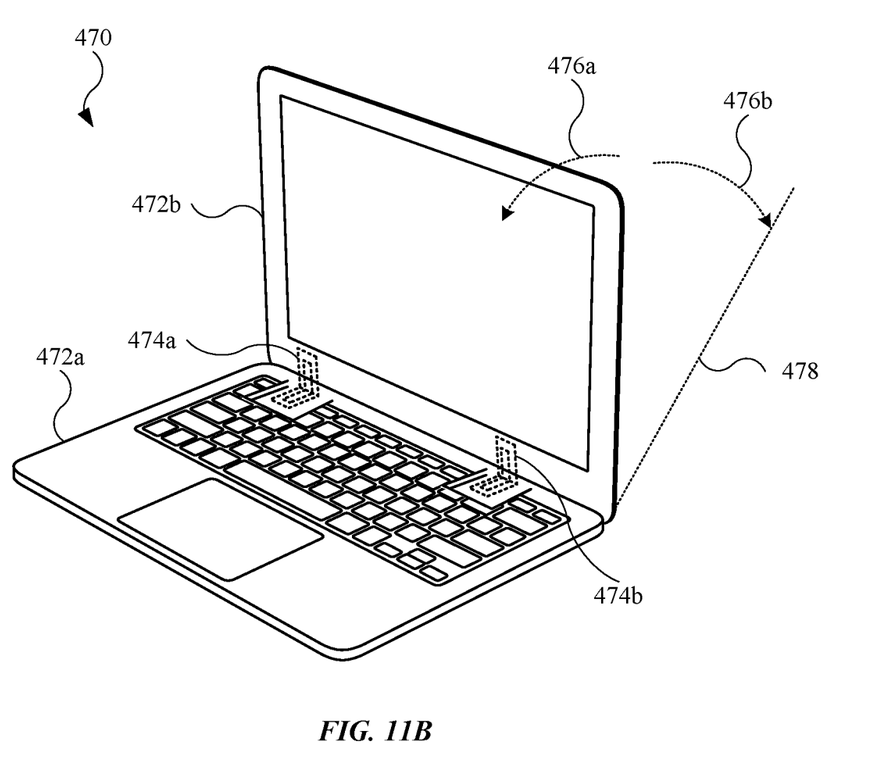

Referring to FIG. 11B, a laptop computing device 470, or simply laptop, includes a base portion 472a and a display housing 472b rotationally coupled to the base portion 472a by a hinge 474a and by a hinge 474b. Each of the hinges 474a and 474b includes a respective assembly designed to control movement of the display housing 472b. For example, the hinges 474a and 474b allow the display housing 472b to rotate in a direction of the arrow 476a such that the display housing 472b rotates over and covers the base portion 472a. However, the hinges 474a and 474b may limit rotation of the display housing 472b in a direction of the arrow 476b such that the display housing 472b can travel only to the line 478, with the line 478 representing part of a desired maximum angle of travel for the display housing 472b.

Figure 11C:
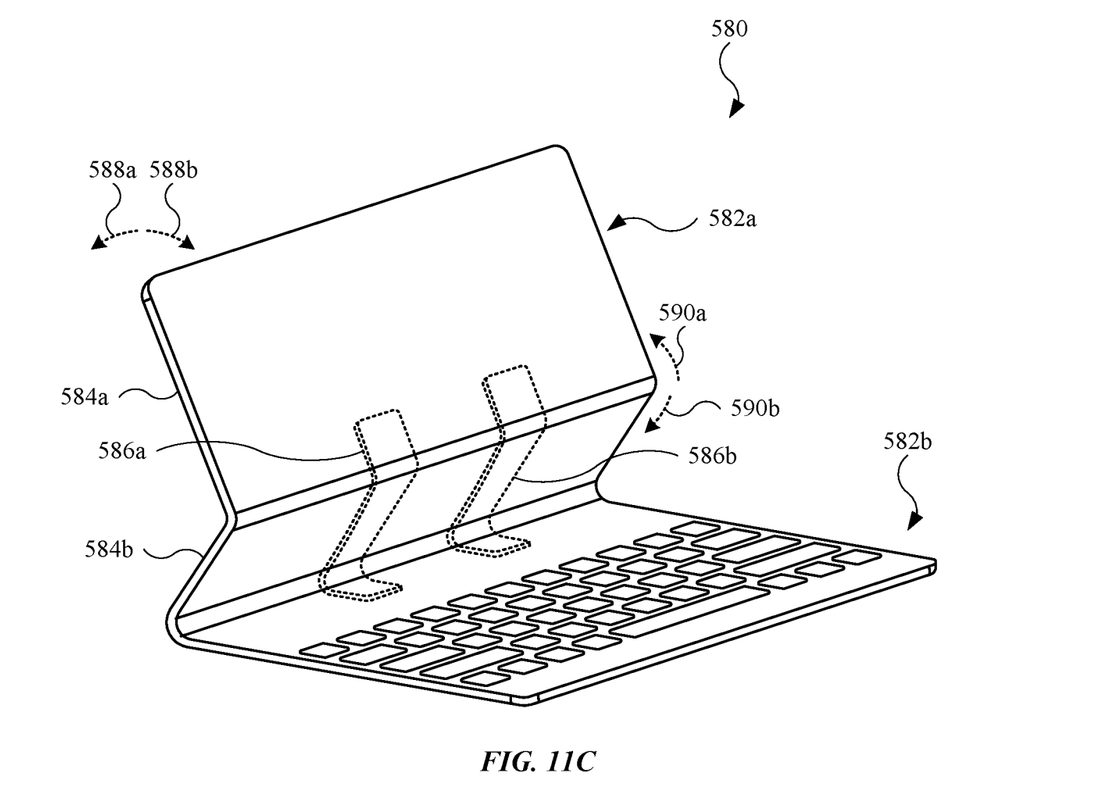

Referring to FIG. 11C, an accessory device 580 (e.g., folio) for tablet computing devices is shown. The accessory device 580 includes a section 582a and a section 582b. Further, the section 582a includes a segment 584a and a segment 584b. The accessory device 580 further includes a hinge 586a and a hinge 586b. Each of the hinges 586a and 586b includes a respective assembly designed to control movement of components of the accessory device 580. For example, the hinges 586a and 586b allow rotational movement of the section 582a relative to the section 582b in either direction of the arrow 588a or the arrow 588b, and may limit the section 582a to a maximum angle relative to the section 582b. Similarly, the hinges 586a and 586b allow rotational movement of the segment 584a relative to the segment 584b in either direction of the arrow 590a or the arrow 590b, and may limit the segment 584a to a maximum angle relative to the segment 584b.

Figure 12:
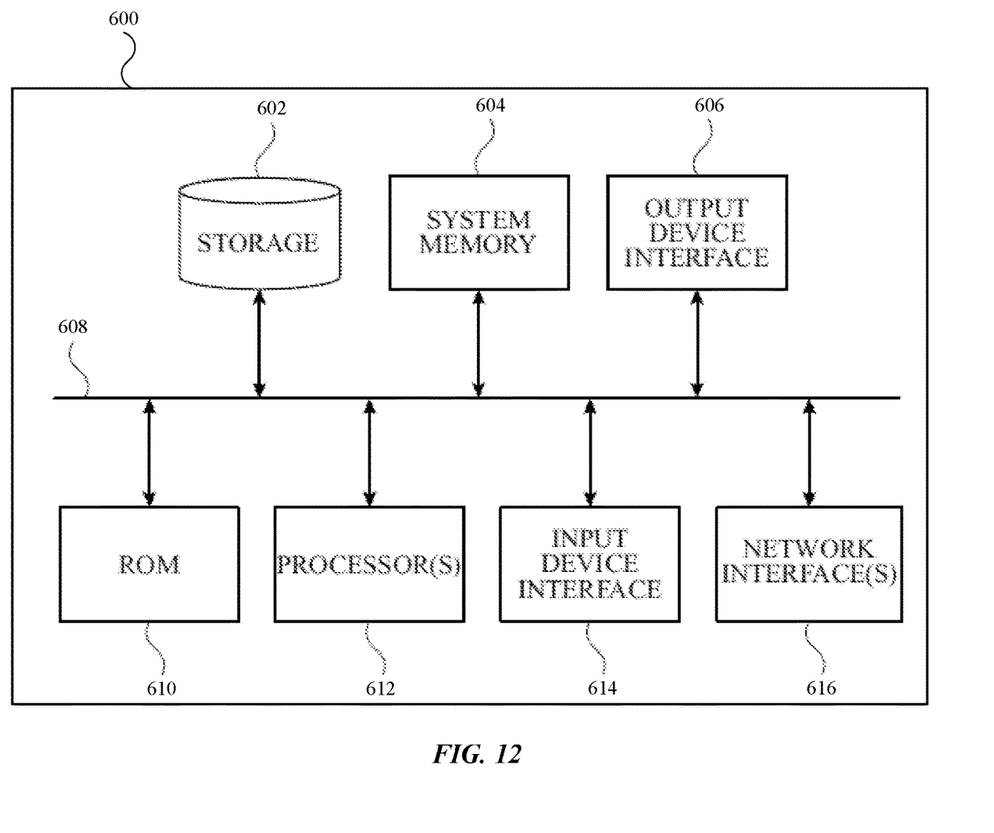
FIG. 12 illustrates a schematic diagram of an electronic system, in accordance with aspects of the present disclosure.

Referring to FIG. 12, an electronic system 600 with which one or more implementations of the subject technology may be implemented is shown. The electronic system 600 can be the head-mountable device 102, as shown in FIG. 1. The electronic system 600 may include various types of computer readable media and interfaces for various other types of computer readable media. The electronic system 600 includes a bus 608 that places in communication a permanent storage device 602, a system memory 604 (and/or buffer), an output device interface 606, a read-only memory (ROM) 610, one or more processing unit(s) 612, an input device interface 614, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610 (which are each implemented as a non-transitory computer-readable medium). From these various memory units, the one or more processing unit(s) 612 retrieves instructions to execute and data to process in order to execute the processes of one or more implementations.

The bus 608 also connects to the input device interface 614 and the output device interface 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 608 also couples the electronic system 600 to one or more networks and/or to one or more network nodes through the one or more network interfaces 616. In this manner, the electronic system 600 can be a part of a network of computers (such as a LAN, a wide area network ("WAN")), or an Intranet, or a network of networks, such as the Internet. Any or all components of the electronic system 600 can be used in conjunction with the subject disclosure.

Various examples of aspects of the disclosure are described below as clauses for convenience. These are provided as examples, and do not limit the subject technology.

Clause A: A band for a head-mountable device includes: an outer cover that includes an internal chamber; and an assembly located in the internal chamber. The assembly includes: a first structure comprising a first tensile strength; a second structure comprising a second tensile strength different from the first tensile strength; and a third structure comprising a third tensile strength different from the first tensile strength and different the second tensile strength.

Clause B: A band for a head-mountable device includes: a first structure, a second structure, and a third structure, wherein in response to an applied force that i) elongates the first structure and the second structure and ii) pulls the third structure, the third structure counters the applied force and prevents further elongation of the first structure and the second structure.

Clause C: A head-mountable device includes: a frame that carries a display; and a band coupled with the frame. The band includes: an outer cover that includes an internal chamber; and an assembly located in the internal chamber. The assembly includes: an elastomer structure including a first tensile strength; a polymer structure including a second tensile strength greater than the first tensile strength; and a metal structure including a third tensile strength greater than the first tensile strength and greater than the second tensile strength.

One or more of the above clauses can include one or more of the features described below. It is noted that any of the following clauses may be combined in any combination with each other, and placed into a respective independent clause, e.g., clause A, B, or C.

Clause 1: wherein the assembly limits elongation of the outer cover while the third structure is under tension.

Clause 2: wherein: in response to the tension, the first structure is elongated from a first length to a second length, and in response to the first structure elongating to the second length, the second structure elongates.

Clause 3: wherein: the third structure is positioned at a first angle relative to the first structure, in response to the tension, the third structure is positioned at a second angle relative to the first structure, the second angle being less than the first angle, and the third structure prevents further elongation of the first structure and the second structure.

Clause 4: wherein: the second tensile strength is greater than the first tensile strength, and the third tensile strength is greater than the second tensile strength.

Clause 5: wherein the third structure is coaxial with respect to the first structure.

Clause 6: wherein the third structure is coaxial with respect to the first structure.

Clause 7: wherein: the first structure includes elastomer, the second structure includes a polymer, and the third structure includes a metal.

Clause 8: wherein the second structure comprises a braided polymer.

Clause 9: wherein the first structure is surrounded by the second structure and the third structure.

Clause 10: wherein the first structure is surrounded by the second structure and the third structure.

Clause 11: wherein: prior to the applied force, the third structure is positioned at a first angle relative to the first structure, and in response to the applied force, the third structure is positioned at a second angle relative to the first structure, wherein the second angle is less than the first angle.

Clause 12: further including an outer cover that includes a first end and a second end opposite the first end, wherein the third structure is coupled to the first end and the second end.

Clause 13: wherein the third structure includes a metal wire.

Clause 14: wherein the polymer structure includes a braided polymer.

Clause 15: wherein the elastomer structure and the metal structure are located within the braided polymer.

Clause 16: wherein the elastomer structure is coaxial with respect to the braided polymer.

Clause 17: wherein the metal structure, under tension, prevents elongation of the outer cover.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A band for a head-mountable device, the band comprising:
   an outer cover that includes an internal chamber; and
   an assembly located in the internal chamber, the assembly comprising:
   a first structure comprising a first tensile strength;
   a second structure comprising a second tensile strength different from the first tensile strength; and
   a third structure comprising a third tensile strength different from the first tensile strength and different the second tensile strength.

2. The band of claim 1, wherein the assembly limits elongation of the outer cover while the third structure is under tension.

3. The band of claim 2, wherein:
   in response to the tension, the first structure is elongated from a first length to a second length, and
   in response to the first structure elongating to the second length, the second structure elongates.

4. The band of claim 3, wherein:
   the third structure is positioned at a first angle relative to the first structure,
   in response to the tension, the third structure is positioned at a second angle relative to the first structure, the second angle being less than the first angle, and
   the third structure prevents further elongation of the first structure and the second structure.

5. The band of claim 1, wherein:
   the second tensile strength is greater than the first tensile strength, and
   the third tensile strength is greater than the second tensile strength.

6. The band of claim 1, wherein the third structure is coaxial with respect to the first structure.

7. The band of claim 6, wherein the third structure is coaxial with respect to the first structure.

8. The band of claim 1, wherein:
   the first structure comprises elastomer,
   the second structure comprises a polymer, and
   the third structure comprises a metal.

9. The band of claim 8, wherein the second structure comprises a braided polymer.

10. The band of claim 1, wherein the first structure is surrounded by the second structure and the third structure.

11. A band for a head-mountable device, the band comprising:
    a first structure,
    a second structure, and
    a third structure, wherein in response to an applied force that i) elongates the first structure and the second structure and ii) pulls the third structure, the third structure counters the applied force and prevents further elongation of the first structure and the second structure.

12. The band of claim 11, wherein the third structure wraps around the first structure.

13. The band of claim 11, wherein:
    prior to the applied force, the third structure is positioned at a first angle relative to the first structure, and
    in response to the applied force, the third structure is positioned at a second angle relative to the first structure, wherein the second angle is less than the first angle.

14. The band of claim 11, further comprising an outer cover that includes a first end and a second end opposite the first end, wherein the third structure is coupled to the first end and the second end.

15. The band of claim 14, wherein the third structure comprises a metal wire.

16. A head-mountable device, comprising:
   a frame that carries a display; and
   a band coupled with the frame, the band comprising:
      an outer cover that includes an internal chamber; and
      an assembly located in the internal chamber, the assembly comprising:
         an elastomer structure comprising a first tensile strength;
         a polymer structure comprising a second tensile strength greater than the first tensile strength; and
         a metal structure comprising a third tensile strength greater than the first tensile strength and greater than the second tensile strength.

17. The head-mountable device of claim 16, wherein the polymer structure comprises a braided polymer.

18. The head-mountable device of claim 17, wherein the elastomer structure and the metal structure are located within the braided polymer.

19. The head-mountable device of claim 17, wherein the elastomer structure is coaxial with respect to the braided polymer.

20. The head-mountable device of claim 16, wherein the metal structure, under tension, prevents elongation of the outer cover.

* * * * *

UNITED STATES PATENT AND TRADEMARK OFFICE
CERTIFICATE OF CORRECTION

| | |
|---|---|
| PATENT NO. | : 12,024,820 B1 |
| APPLICATION NO. | : 18/225614 |
| DATED | : July 2, 2024 |
| INVENTOR(S) | : William Leith et al. |

It is certified that error appears in the above-identified patent and that said Letters Patent is hereby corrected as shown below:

In the Specification

Column 9, Line 48: Replace: "different the second tensile strength.", with: --different from the second tensile strength.--.

In the Claims

Column 12, Lines 14-15 (Claim 1): Replace: "different the second tensile strength.", with: --different from the second tensile strength.--.

Signed and Sealed this
Twenty-ninth Day of October, 2024

Katherine Kelly Vidal
*Director of the United States Patent and Trademark Office*